United States Patent [19]

Midorikawa et al.

[11] Patent Number: 5,684,073
[45] Date of Patent: Nov. 4, 1997

[54] PNEUMATIC TIRE HAVING IMPROVED ABRASION RESISTANCE

[75] Inventors: Shingo Midorikawa; Kinya Kawakami; Yasushi Kikuchi; Motoji Fujita, all of Hiratsuka, Japan

[73] Assignee: The Yokohama Rubber Co., Ltd., Tokyo, Japan

[21] Appl. No.: 431,778

[22] Filed: May 1, 1995

[30] Foreign Application Priority Data

May 13, 1994 [JP] Japan .................. 6-099914

[51] Int. Cl.$^6$ ........................... C08K 5/17
[52] U.S. Cl. ............... 524/254; 524/87; 524/495; 524/496
[58] Field of Search ................ 524/254, 87, 495, 524/496

[56] References Cited

U.S. PATENT DOCUMENTS

| | | | |
|---|---|---|---|
| 4,158,000 | 6/1979 | Nagasaki et al. | 260/45.8 NW |
| 4,519,430 | 5/1985 | Ahmad et al. | 152/209 R |
| 5,191,003 | 3/1993 | Inui et al. | 524/206 |
| 5,420,193 | 5/1995 | Matsue et al. | 524/495 |

FOREIGN PATENT DOCUMENTS

| | | |
|---|---|---|
| 60-50213 | 3/1985 | Japan . |
| 60-250051 | 10/1985 | Japan . |
| 250051 | 12/1985 | Japan . |
| 61-44004 | 3/1986 | Japan . |
| 63-10646 | 1/1988 | Japan . |
| 1-135843 | 5/1989 | Japan . |

*Primary Examiner*—Edward J. Cain
*Attorney, Agent, or Firm*—Finnegan, Henderson, Farabow, Garrett & Dunner, L.L.P.

[57] ABSTRACT

The cap tread portion composed of a rubber composition having a tanδ (0° C.) of at least 0.45 and a tanδ (60° C.) of at least 0.25 comprising (i) a p-phenylenediamine type antioxidant, 2,2,4-trimethyl-1,2-dihydroquinoline etc, and carbon black having a nitrogen specific surface area of at least 70 m$^2$/g and a 24M4DBP of at least 80 ml/100 g or (ii) a p-phenylenediamine based antioxidant, a 2,2,4-trimethyl-1,2-dihydroquinoline or other polymer mixture of a specific polymer content, and carbon black having a nitrogen specific surface area of at least 70 m$^2$/g and a 24M4DBP of at least 80 ml/100 g, blended with a rubber.

1 Claim, No Drawings

5,684,073

PNEUMATIC TIRE HAVING IMPROVED ABRASION RESISTANCE

BACKGROUND OF THE INVENTION

Field of the Invention

The present invention relates to a pneumatic tire with an improved abrasion resistance. More specifically, it relates to a pneumatic tire having the improved abrasion resistance while maintaining an excellent steering stability and high grip performance.

In a pneumatic tire composed of a tread portion constituted by a cap tread and under tread, a shoulder portion, a sidewall portion, and a bead portion, the tread portion, in particular the cap tread portion which comes into contact with the road surface which is driven on, is an important part which comes into contact with the road surface being driven on when the tire is in motion. As is well known in the art, it is necessary to protect the carcass and secure an excellent steering stability, high grip performance, and superior abrasion resistance.

When trying to secure the maximum area of contact of the tire so as to improve the abrasion resistance, however, the groove area conversely becomes smaller and the steering stability and grip performance end up declining. Further, when polybutadiene rubber is blended to improve the abrasion resistance, the steering stability undesirably drops. In this way, there is an antinomic relationship between the abrasion resistance and the steering stability and grip performance, and therefore, it has been extremely difficult to achieve of the required properties.

In the past, several proposals have been made regarding the rubber composition comprising the cap tread portion and the sidewall portion. For example, Japanese Unexamined Patent Publication (Kokai) No. 61-44004 describes to improve the outer appearance of the sides of a pneumatic tire by blending 1 to 5 phr (per hundred rubber), that is, in a ratio of 1/1 to 5/1, N-(1,3-dimethylbutyl)-N'-phenyl-p-phenylene diamine or N-isopropyl-N'-phenyl-p-phenylenediamine and 6-ethoxy-1,2-dihydro-2,2,4-trimethylquinoline or 6-anilino-2,2,4-trimethyl-1,2-dihydroquinoline, but this publication does not disclose anything at all about improving the abrasion resistance of a pneumatic tire while maintaining its steering stability.

Japanese Unexamined Patent Publication (Kokai) No. 63-10646 describes to improve the outer apperaance of the sides of a pneumatic tire by blending 0.5 to 5 phr of N-(1,3-dimethylbutyl)-N'-phenyl-p-phenylenediamine or N-isopropyl-N'-phenyl-p-phenylenediamine and 0.15 to 5 parts by weight of p-phenylenediamine with a high carbon content, but this publication also does not disclose anything at all regarding improving the abrasion resistance of the pneumatic tire while maintaining its steering stability.

Japanese Unexamined Patent Publication (Kokai) No. 60-50213 discloses a rubber antioxidant useful for preventing flexural cracks and thermal aging composed of a 2,2,4-trimethyl-1,2-dihydroquinoline polymer of a specific composition, but this publication does not disclose anything at all regarding improving the abrasion resistance of the pneumatic tire while maintaining its steering stability.

Japanese Unexamined Patent Publication (Kokai) No. 60-250051 discloses a rubber antioxidant for improving the ozone-resistance comprising 5-anilino-2,2-4-trimethyl-1,2-dihydroquinoline and N-phenyl-N'-alkyl-p-phenylenediamine, but this publication also does not disclose anything at all regarding improving the abrasion resistance of the pneumatic tire while maintaining its steering stability.

Japanese Unexamined Patent Publication (Kokai) No. 1-135843 describes the improvement in the outer appearance of a tire by a rubber composition obtained by blending at least 5 phr of N-(1,3-dimethylbutyl)-N'-phenyl-p-phenylenediamine and/or N-isopropyl-N'-phenyl-p-phenylenediamine and not including waxes, but this publication also does not disclose anything at all regarding improving the abrasion resistance of the pneumatic tire, while maintaining its steering stability.

SUMMARY OF THE INVENTION

Accordingly, the object of the present invention is to provide a pneumatic tire having the improved abrasion resistance, while maintaining an excellent steering stability and high grip performance.

In accordance with the present invention, there is provided a pneumatic tire having its cap tread portion composed of a rubber composition having a tan$\delta$ (0° C.) of at least 0.45 and a tan$\delta$ (60° C.) of at least 0.25 comprising (i) 3 to 10 parts by weight of a p-phenylenediamine type antioxidant, (ii) 1 to 10 parts by weight of a mixture of (a) 2,2,4-trimethyl-1,2-dihydroquinoline or its derivatives and (b) polymers thereof, and (iii) 30 to 100 parts by weight of carbon black with a nitrogen specific surface area of at least 70 m$^2$/g and a 24M4DBP of at least 80 ml/100 g, blended with 100 parts by weight of a rubber.

In accordance with the present invention, there is further provided a pneumatic tire having its cap tread portion composed of a rubber composition having a tan$\delta$ (0° C.) of at least 0.45 and a tan$\delta$ (60° C.) of at least 0.25 comprising (i) 1 to 10 parts by weight of a p-phenylenediamine type antioxidant, (ii) 1 to 10 parts by weight of a mixture of (a) 2,2,4-trimethyl-1,2-dihydroquinoline or its derivatives and (b) polymers thereof wherein the dimer content is at least 20% by weight, the trimer content is at least 15% by weight, and the tetramer content is at least 5% by weight wherein the total content of the di- to tetra-mers is at least 45% by weight, and (iii) 30 to 100 parts by weight of carbon with a nitrogen specific surface area of at least 70 m$^2$/g and a 24M4DBP of at least 80 ml/100 g, blended with 100 parts by weight of a rubber.

The structure of the pneumatic tire according to the present invention is not particularly limited and may be made any construction of pneumatic tire known in the past and further various structures of pneumatic tires currently under development. For example, however, a radial construction pneumatic tire is preferred.

According to the present invention, however, as mentioned previously, the cap tread portion of the pneumatic tire is composed of a rubber composition comprising a combination of specific antioxidants and a specific carbon black, blended in specific ratios in a rubber blend.

As the polymer component of the rubber composition usable in the present invention, use may be made of any polymer generally used for tires in the past, for example, natural rubber (NR), various styrene-butadiene copolymer rubbers (SBR), various polybutadiene rubbers (BR), various polyisoprene rubbers (IR), etc. alone or in mixtures. The particularly preferred rubber components are diene type rubbers mainly composed of SBR, in particular, ones where at least 50% of the total polymer is SBR.

According to the first aspect of the present invention, as the rubber composition of the cap tread portion, it is necessary to blend into 100 parts by weight of the rubber (i) 3 to 10 parts by weight, preferably 4 to 9 parts by weight, of a p-phenylenediamine based antioxidant and (ii) 1 to 10 parts by weight, preferably 2 to 9 parts by weight, of a mixture of (a) 2,2,4-trimethyl-1,2-dihydroquinoline or its derivatives and (b) the polymers thereof. When the amount of the diamine based antioxidant is too small or the amount of the quinoline based compound is too small, it is not preferable that the desired effect of improvement in the abrasion resistance is not observed. Contrary to this, when the amounts are too large, there is little further effect of improvement in the abrasion resistance and blooming and higher costs are unpreferably caused.

According to the second aspect of the present invention, the rubber composition of the cap tread portion, as mentioned above, must be a blend, based upon 100 parts by weight of rubber, of (i) 1 to 10 parts by weight, preferably 2 to 9 parts by weight, of a p-phenylenediamine based antioxidant and (ii) 1 to 10 parts by weight, preferably 2 to 9 parts by weight, of a mixture of (a) 2,2,4-trimethyl-1,2-dihydroquinoline or its derivatives and (b) the polymers thereof wherein the dimer content is at least 20% by weight, preferably at least 35% by weight, the trimer content is at least 15% by weight, preferably at least 25% by weight, and the tetramer content is at least 5% by weight, preferably at least 10% by weight, and where the total content of the di- to tetra-mers is at least 45% by weight, preferably at least 70% by weight. When the amounts are too small, the desired effect of improvement in the abrasion resistance cannot be observed, while when the amounts are too large, there is little further effect of improvement in the abrasion resistance and blooming and higher costs are unpreferably caused.

The quinoline based compounds usable in the second aspect of the present invention must have at least the specific contents of di- to tetra-mers mentioned above. When the minimum contents are not used, the desired effect of improvement in the abrasion resistance is unpreferably not obtained.

As the p-phenylene diamine type antioxidant usable in the present invention, mention may be made, for example, of N-phenyl-N'-(1,3-dimethylbutyl)-p-phenylene diamine, N-phenyl-N'-isopropyl-p-phenylene diamine, N,N'-diphenyl-p-phenylene diamine, N,N'-diallyl-p-phenylene diamine, N-phenyl-N'-dichlorohexyl-p-phenylene diamine, N-phenyl-N'-octyl-p-phenylene diamine, etc. These may be used alone or any mixtures thereof.

As the 2,2,4-trimethyl-1,2-dihydroquinoline derivatives usable in the present invention, mention may be made, for example, of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline, etc.

The carbon black blended in the rubber composition used in the present invention, as mentioned previously, must have a nitrogen specific surface area (i.e., $N_2SA$: specific surface area measured using nitrogen in accordance with method of ASTM D3037-78) of at least 70 $m^2/g$, preferably at least 100 $m^2/g$, and a 24M4DBP, measured in accordance with method of ASTM D3493, of at least 80 ml/100 g, preferably at least 90 ml/100 g. When the nitrogen specific surface area or 24M4DBP value of the carbon black used falls below the above defined values, both the abrasion resistance and the steering stability unpreferably deteriorate.

The amount of the carbon black blended in the rubber composition usable in the present invention is 30 to 100 parts by weight (phr), preferably 40 to 90 parts by weight (phr) based upon 100 parts by weight of the rubber. When the amount is too small, the steering stability undesirably declines. Contrary to this, when too large, the strength of the rubber declines and the abrasion resistance drops or the millability deteriorates undesirably.

The rubber composition according to the present invention has a tanδ (0° C.) after vulcanization of at least 0.45, preferably at least 0.55, and a tanδ (60° C.) of at least 0.25, preferably at least 0.35. When these values are not met, the steering stability and the grip performance unpreferably decline.

The rubber composition usable in the present invention may be blended with, in addition to the above-mentioned essential components, any additives generally used in tire formulations. The amounts blended may be the general amounts as well. As such additives, mention may be made, for example, of sulfur, vulcanization accelerators, fillers, softening agents, plasticizers, etc.

Other than having a specific rubber composition vulcanized to form the cap tread portion, the pneumatic tire according to the present invention may be made using general methods and apparatuses.

EXAMPLES

The present invention will now be further explained in detail, but is by no means limited to, the following Examples.

Examples 1 to 4 and Comparative Examples 1 and 2

The components shown in Table 1 were blended in the amounts shown (parts by weight), then the rubber ingredients, except for the vulcanization accelerator and sulfur, and the compounding chemicals were mixed in a 1.7 liter Banbury mixer for 5 minutes. The vulcanization accelerator and the sulfur were kneaded with the blend by an 8-inch test-use kneading roll machine for 4 minutes to obtain the rubber compositions. The rubber compositions were press vulcanized at 160° C. for 20 minutes to prepare the desired test pieces. These were subjected to various tests to determine their physical properties. The physical properties of the resultant vulcanizates are as shown in Table 1.

It should be noted that the physical properties of the vulcanizates and the evaluation of the results of the tire running tests (tire size 195/60R14) were determined by the following methods:

1) tanδ (0° C. and 60° C.)

These are the values obtained by measurement using a viscoelastic spectrometer (made by Toyo Seiki) under conditions of temperatures of 0° C. and 60° C. and an initial strain of 10%, a dynamic strain of ±2%, and a frequency of 20 Hz. The tanδ at 0° C. is the measure for the gripping force on a wet road, while the tanδ at 60° C. is the measure on a dry road. The larger the tanδ values, the larger the gripping force of the tire.

2) Lamborne Abrasion Index

A Lamborne abrasion tester (made by Iwamoto Seisakusho) was used to measure the amount of abrasion under a predetermined condition of a temperature of 20° C. The results were shown as indexes using the value of Comparative Example 1, 3, or 5 as 100. The larger the index value, the more excellent the abrasion resistance.

3) Wet Skid Resistance

This was measured under conditions of a temperature of 20° C. using a British Portable Skid Tester. The results were shown as indexes using the value of Comparative Example 1, 3, or 5 as 100. The larger the index value, the more superior the skid resistance shown.

4) Dry Steering Stability

Test drivers scored the feelings of various tires on a dry road surface. The results were shown as indexes using the value of Comparative Example 1 or 5 as 100. The larger the index value, the more excellent the steering stability.

5) Wet Braking Performance

The braking distance was measured when driving on an asphalt road surface sprinkled with water at an initial speed of 40 km/h and then braking. The results were shown as indexes using the value of Comparative Example 1 or 5 as 100. The larger the index value, the more excellent the braking performance.

6) Abrasion Resistance

The amounts of abrasion of tires after driving on a dry road surface for 10,000 km under conditions of the designed ordinary load and air pressure prescribed by the JATMA were shown as indexes using the value of Comparative Example 1 or 5 as 100. The larger the index value, the more excellent the abrasion resistance.

7) Methods of Measurement of Properties of Carbon Black a) Nitrogen Specific Surface Area ($N_2SA$) According to ASTM-D3037-78 "Standard Methods of Treating Carbon Black-Surface Area by Nitrogen Adsorption" Method.

b) 24M4DBP Oil Absorption Measured by ASTM-D-3493.

8) Method of Measurement of Degree of Polymerization of 2,2,4-Trimethyl-1,2-Dihydroquinoline Polymer The percentages by weight of the di-, tri-, and tetra-mers were measured using gas chromatography according to the internal standard method.

4) Carbon black-1 ... $N_2SA$=132 $m^2/g$, 24M4DBP=100 ml/100 g

5) Carbon black-2 ... $N_2SA$=84 $m^2/g$, 24M4DBP=108 ml/100 g

6) Carbon black-3 ... $N_2SA$=44 $m^2/g$, 24M4DBP=75 ml/100 g

7) Antioxidant-1 ... N-phenyl-N'-(1,3-dimethylbutyl)-p-phenylene diamine

8) Antioxidant-2 ... poly-(2,2,4-trimethyl-1,2-dihydroquinoline) Di-/tri-/tetra-mer=40/29/15% by weight, total of di-, tri-, and tetra-mers=85% by weight.

9) Antioxidant-3 ... chemical name same as antioxidant-2, but di-/tri-/tetra-mer=11/9/4% by weight and total=24% by weight.

10) Antioxidant-4 ... chemical name same as antioxidant-2, but di-/tri-/tetra-mer=21/13/5% by weight and total=39% by weight.

11) Zinc oxide: "Zinc White No. 3" made by Seido Chemical Industry Co., Ltd.

12) Stearic acid: "Lunac YA" made by Kao Corporation.

13) Wax: "Sunnoc" made by Ouchi Shinkyo Chemical Industrial Co., Ltd.

14) Aromatic oil: "Process Oil X-140" made by Kyodo Sekiyu.

15) Sulfur: Oil treated sulfur

16) Vulcanization accelerator: N-tert-butyl-2-benzothiazolylsulfenamide (Nocceler-NS-F made by Ouchi Shinkyo Chemical Industrial Co., Ltd.)

TABLE 1

|  | Comp. Ex. 1 | Example No. 1 | Example No. 2 | Example No. 3 | Example No. 4 | Comp. Ex. 2 |
|---|---|---|---|---|---|---|
| Formulation (parts by weight) | | | | | | |
| SBR-1 | 68.75*[1] | 68.75*[1] | 68.75*[1] | 68.75*[1] | 68.75*[1] | 68.75*[1] |
| SBR-2 | 68.75*[1] | 68.75*[1] | 68.75*[1] | 68.75*[1] | 68.75*[1] | 68.75*[1] |
| Carbon black 1 | 90 | 90 | 90 | 90 | 90 | 90 |
| Antioxidant-1 | 2 | 4 | 6 | 10 | 4 | 4 |
| Antioxidant-2 | — | — | — | — | 3 | — |
| Antioxidant-3 | — | 3 | 3 | 3 | — | — |
| Zinc oxide | 3 | 3 | 3 | 3 | 3 | 3 |
| Stearic acid | 2 | 2 | 2 | 2 | 2 | 2 |
| Wax | 0.5 | 0.5 | 0.5 | 0.5 | 0.5 | 0.5 |
| Aromatic oil | 7.5 | 7.5 | 7.5 | 7.5 | 7.5 | 7.5 |
| Sulfur | 1.8 | 1.8 | 1.8 | 1.8 | 1.8 | 1.8 |
| Vulcanization accelerator | 1.5 | 1.5 | 1.5 | 1.5 | 1.5 | 1.5 |
| tanδ (0° C.) | 0.70 | 0.70 | 0.72 | 0.72 | 0.72 | 0.71 |
| tanδ (60° C.) | 0.43 | 0.43 | 0.43 | 0.43 | 0.43 | 0.43 |
| Lamborne abrasion index | 100 | 109 | 115 | 120 | 122 | 100 |
| Wet skid resistance | 100 | 100 | 100 | 100 | 100 | 100 |
| Dry steering stability | 100 | — | 100 | — | — | — |
| Wet braking performance | 100 | — | 100 | — | — | — |
| Abrasion resistance | 100 | — | 112 | — | — | — |

*[1]50 parts by weight as pure rubber.

The components used in the following Examples and Comparative Examples were as follows:

1) SBR-1 ... "Nipol 1712" made by Nippon Zeon Co., Ltd. (37.5 phr oil extension) (styrene content: 23.5 wt %, 1,2-vinyl content: 15%)

2) SBR-2 ... "Nipol 9520" made by Nippon Zeon Co., Ltd. (37.5 phr oil extension) (styrene content: 38 wt %, 1,2-vinyl content: 14%)

3) BR ... "Nipol BR-1441" made by Nippon Zeon Co., Ltd. (37.5 phr oil extension)

Example 5 and Comparative Examples 3 and 4

Various tests were conducted using the rubber compositions of the formulations shown in Table 2 in the same way as the above-mentioned examples and comparative examples. The results are as shown in Table 2.

TABLE 2

| Formulation (parts by weight) | Comp. Ex. 3 | Ex. 5 | Comp. Ex. 6 |
|---|---|---|---|
| SBR-1 | 137.5*[1] | 137.5*[1] | 137.5*[1] |
| Carbon black 1 | 90 | 90 | — |
| Antioxidant-1 | — | — | 70 |
| Antioxidant-2 | 2 | 2 | 2 |
| Antioxidant-3 | — | 3 | 3 |
| Zinc oxide | 3 | 3 | 3 |
| Stearic acid | 2 | 2 | 2 |
| Wax | 0.5 | 0.5 | 0.5 |
| Aromatic oil | 7.5 | 7.5 | — |
| Sulfur | 1.8 | 1.8 | 1.8 |
| Vulcanization accelerator | 1.5 | 1.5 | 1.5 |
| tanδ (0° C.) | 0.54 | 0.55 | 0.42 |
| tanδ (60° C.) | 0.37 | 0.37 | 0.23 |
| Lamborne abrasion index | 100 | 107 | 110 |
| Wet skid resistance | 100 | 100 | 91 |

*[1] 100 parts by weight as pure rubber component.

Examples 6 to 9 and Comparative Examples 5 to 10

Various tests were conducted using the rubber compositions of the formulations shown in Table 3 in the same way as the above-mentioned examples and comparative examples. The results are as shown in Table 3.

TABLE 4

| Formulation (parts by weight) | Ex. 10 | Comp. Ex. 11 |
|---|---|---|
| SBR-1 | 110*[1] | 110*[1] |
| BR | 27.5*[1] | 27.5*[1] |
| Carbon black 1 | 90 | 90 |
| Carbon black-2 | — | — |
| Antioxidant-1 | 2 | 2 |
| Antioxidant-2 | 5 | — |
| Zinc oxide | 3 | 3 |
| Stearic acid | 2 | 2 |
| Wax | 0.5 | 0.5 |
| Aromatic oil | 7.5 | 7.5 |
| Sulfur | 1.8 | 1.8 |
| Vulcanization accelerator | 1.5 | 1.5 |
| tanδ (0° C.) | 0.52 | 0.51 |
| tanδ (60° C.) | 0.35 | 0.35 |
| Lamborne abrasion index | 115 | 100 |
| Wet skid resistance | 100 | 100 |

*[1] 100 parts by weight as pure rubber component

As shown in Table 1 to Table 4, the formulations according to the present invention give pneumatic tires superior in abrasion resistance (Lamborne abrasion index and abrasion resistance in actual driving) while maintaining the steering stability (wet skid resistance, dry steering stability in actual driving, and wet braking performance in actual driving) at least equal to that of typical examples of the prior art (Comparative Examples 1, 3, 5, and 11).

TABLE 3

| | | Example | | | | Comparative Example | | | | |
|---|---|---|---|---|---|---|---|---|---|---|
| Formulation (parts by weight) | Comp. Ex. 5 | 6 | 7 | 8 | 9 | 6 | 7 | 8 | 9 | 10 |
| SBR-1 | 68.75*[1] | 68.75*[1] | 68.75*[1] | 68.75*[1] | 68.75*[1] | 68.75*[1] | 68.75*[1] | 68.75*[1] | 68.75*[1] | 68.75*[1] |
| SBR-2 | 68.75*[1] | 68.75*[1] | 68.75*[1] | 68.75*[1] | 68.75*[1] | 68.75*[1] | 68.75*[1] | 68.75*[1] | 68.75*[1] | 68.75*[1] |
| Carbon black-1 | 90 | 90 | 90 | 90 | 90 | 90 | 90 | 90 | 90 | — |
| Carbon black-2 | — | — | — | — | — | — | — | — | — | 90 |
| Antioxidant-1 | 2 | 2 | 2 | 2 | 2 | 2 | 2 | 2 | — | 2 |
| Antioxidant-2 | — | 2 | 3 | 5 | 10 | — | — | 1 | 3 | 3 |
| Antioxidant-3 | — | — | — | — | — | 3 | — | — | — | — |
| Antioxidant-4 | — | — | — | — | — | — | 3 | — | — | — |
| Zinc oxide | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Wax | 0.5 | 0.5 | 0.5 | 0.5 | 0.5 | 0.5 | 0.5 | 0.5 | 0.5 | 0.5 |
| Aromatic oil | 7.5 | 7.5 | 7.5 | 7.5 | 7.5 | 7.5 | 7.5 | 7.5 | 7.5 | — |
| Sulfur | 1.8 | 1.8 | 1.8 | 1.8 | 1.8 | 1.8 | 1.8 | 1.8 | 1.8 | 1.8 |
| Vulcanization accelerator | 1.5 | 1.5 | 1.5 | 1.5 | 1.5 | 1.5 | 1.5 | 1.5 | 1.5 | 1.5 |
| tanδ (0° C.) | 0.70 | 0.71 | 0.71 | 0.72 | 0.73 | 0.71 | 0.71 | 0.70 | 0.71 | 0.46 |
| tanδ (60° C.) | 0.43 | 0.43 | 0.43 | 0.43 | 0.42 | 0.43 | 0.43 | 0.43 | 0.43 | 0.25 |
| Lamborne abrasion index | 100 | 107 | 110 | 116 | 122 | 100 | 101 | 101 | 101 | 82 |
| Wet skid resistance | 100 | 100 | 100 | 100 | 101 | 100 | 100 | 100 | 100 | 87 |
| Dry steering stability | 100 | — | — | 100 | — | — | — | — | — | — |
| Wet braking performance | 100 | — | — | 101 | — | — | — | — | — | — |
| Abrasion resistance | 100 | — | — | 113 | — | — | — | — | — | — |

*[1]: Same as Comparative Example 1 mentioned earlier.
*[2]: 50 parts by weight as pure rubber component.

Example 10 and Comparative Example 11

Various tests were conducted using the rubber compositions of the formulations shown in Table 4 in the same way as the above-mentioned Examples and Comparative Examples. The results are as shown in Table 4.

That is, Table 1, showing the results of formulations in accordance with the first aspect of the present invention (Comparative Examples 1 and 2 and Examples 1 to 4), shows the results of tests on a system in which the carbon black (within prescribed scope of present invention) and other compounding chemicals added to the system of SBR-1 and SBR-2 are fixed and the amounts of the p-phenylene diamine antioxidant (antioxidant-1) are changed and 2,2,4- trimethyl-1,2-dihydroquinoline (antioxidant-2 or 3) are blended (Examples 1 to 4) and a system in which the latter are not blended (Comparative Examples 1 and 2).

Comparative Example 1 is a typical conventional cap tread formulation. Compared with Comparative Example 1, in which 2 parts of the antioxidant-1 are blended, in Examples 1 and 4, where the amount is made 4 parts and the antioxidant-2 or 3 is blended, a superior abrasion resistance is exhibited while maintaining the wet skid resistance (in particular, Example 4 in accordance with the second aspect of the present invention, in which an antioxidant-2 with a total content of the di-, tri-, and tetra-mers is 85 percent, exhibits a remarkably superior abrasion resistance). In Examples 2 and 3, in which the amounts of the antioxidant-3 in the system of Example 1 are increased, the abrasion resistance is further improved while maintaining the wet skid resistance.

Table 2, showing the results of formulations in accordance with the second aspect of the present invention (Comparative Examples 3 and 4 and Example 5), shows that in an exclusively SBR-1 system, the system of Example 5 which has the antioxidant-2 blended in it in accordance with the present invention is improved in the Lamborne abrasion index while maintaining the wet skid resistance as compared with Comparative Example 3 of the typical conventional cap tread formulation, but Comparative Example 4 has tanδ (0° C. and 60° C.) values lower than the prescribed values of the present invention, so is improved in the Lamborne abrasion index, but is inferior in the wet skid resistance.

Table 3, showing the results of other formulations in accordance with the second aspect of the present invention (Examples 6 to 9 and Comparative Examples 5 to 10), shows different types and amounts of carbon black and antioxidants added to the blends of SBR-1 and BR. From the results of Table 3, it is clear that the formulations according to the present invention exhibit a superior abrasion resistance while maintaining the steering stability.

Comparative Example 5 is a typical conventional cap tread formulation. In a system with 2 parts by weight of the antioxidant-1 blended, in the formulations of Examples 6 to 9 with the antioxidants having the di-, tri-, and tetra-mers in the prescribed values of the second aspect of the present invention changed in amount to 2, 3, 5, and 10 parts by weight, the Lamborne abrasion index is remarkably improved while maintaining the wet skid resistance. Further, even in the results of the driving test (Example 8), the abrasion resistance was remarkably improved while maintaining the dry steering stability and the wet braking performance compared with the typical conventional Comparative Example 5.

As opposed to this, in Comparative Examples 6 and 7 where antioxidants-3 or 4 with small contents of di- to tetra-mers, the desired effect of improvement of the abrasion resistance could not be observed. Even in Comparative Example 8 where the contents of the di- to tetra-mers were satisfied, but the amounts of the antioxidants were small, the desired effect of improvement of the abrasion resistance could not be observed. Further, even with Comparative Example 9 where use was not made of the amine type antioxidant, that is, the antioxidant-1, the effect of improvement of the abrasion resistance could not be observed. Further, Comparative Example 10 in which was blended the carbon black-3 with an $N_2SA$ and 24M4DBP value not satisfying the prescribed values of the present invention was inferior in both of the Lamborne abrasion index and the wet skid resistance.

Table 4, showing the results of other formulations in accordance with the second aspect of the present invention (Example 10 and Comparative Example 11), shows different types and amounts of carbon black and antioxidants added to the blends of SBR-1 and BR. From the results of Table 4, it is clear that the formulations according to the present invention exhibit a superior abrasion resistance while maintaining the steering stability.

As explained above, according to the present invention, it is possible to obtain a pneumatic tire whose abrasion resistance is improved, while maintaining an excellent steering stability and high grip performance. This is believed to be because the present pneumatic tire according to the present invention prevents the aging of the rubber and remarkably improves the abrasion resistance through the synergistic action of the superior ozone resistance and anti-oxidation of the p-phenylene diamine antioxidant and the superior heat resistance and flexural resistance of the dihydroquinoline antioxidant.

We claim:

1. A pneumatic tire having a cap tread portion composed of a rubber composition having a tanδ (0° C.) of at least 0.45 and a tanδ (60° C.) of at least 0.25, which composition comprises a blend of:

(i) 1 to 10 parts by weight of a p-phenylenediamine antioxidant, (ii) 1 to 10 parts by weight of a mixture of the polymers of 2,2,4-trimethyl-1,2-dihydroquinoline where the dimer content is at least 20% by weight, the trimer content is at least 15% by weight, and the tetramer content is at least 5% by weight, wherein the total content of the di-to tetra-mers is at least 45% by weight;

(iii) 30 to 100 parts by weight of carbon black having a nitrogen specific surface area of at least 70 $m^2/g$ and a 24M4DBP of at least 80 ml/100 g; and 100 parts by weight of a rubber, wherein at least 50% of the total rubber is styrene-butadiene copolymer rubber.

* * * * *